Oct. 7, 1952          S. STEINBERG          2,612,718
CHUM-DISPENSING UNIT FOR FISHERMEN
Filed April 28, 1950
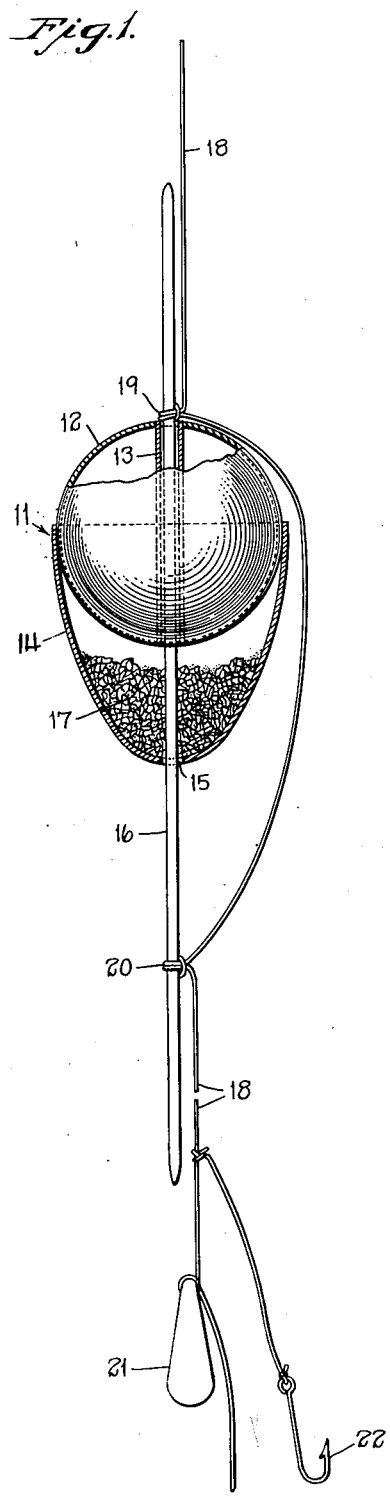
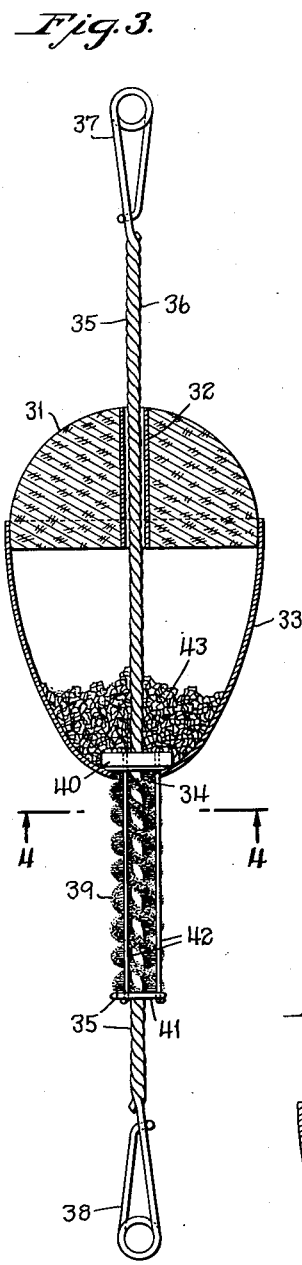
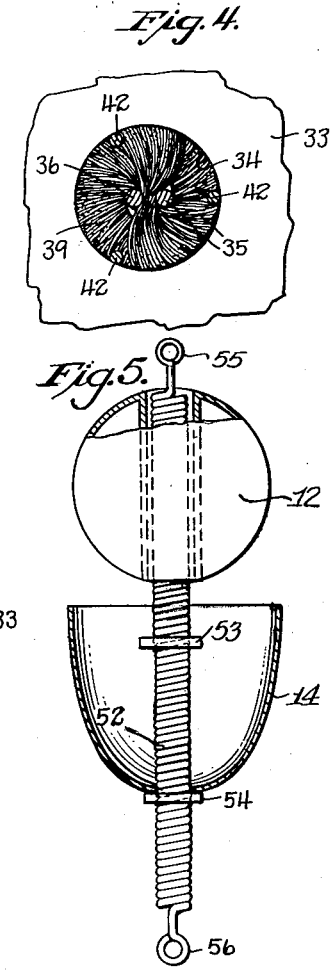
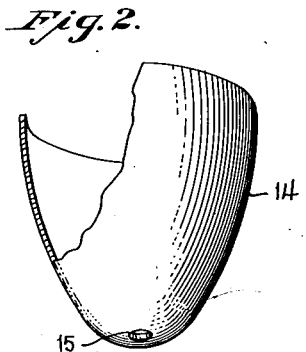
Samuel Steinberg
Inventor
By Seymour, Earle & Nichol
Attorneys Patented Oct. 7, 1952

2,612,718

UNITED STATES PATENT OFFICE 2,612,718

CHUM-DISPENSING UNIT FOR FISHERMEN

Samuel Steinberg, New Haven, Conn.

Application April 28, 1950, Serial No. 158,883

12 Claims. (Cl. 43—43.15)

This invention relates in general to fishing tackle, having for one of its objects the provision of a superior device for dispensing chum in an economical manner.

Another object of the invention is the provision of an assembly embodying a float-member and a chum-holder organized as a unit.

Another object of the invention is to provide a novel combination float and chum-dispensing device in the form of a compact unit of conventional configuration and size and particularly designed and adapted to efficiently serve as a float and also economically and simultaneously dispense chum, when desired.

A further object of the invention is the provision of an improved device of the kind indicated, of comparatively simple and inexpensive construction, adapted for fresh and salt-water fishing and having a structure assuring long life, ease in dispensing and replenishing with chum, and adjustable for use either on the surface of the water or at any desired depth thereof.

Other objects and advantages will appear to those skilled in the art from the following, considered in conjunction with the accompanying drawings.

As is well known, the dispensing of chum for the purpose of attracting fish to a given locality greatly increases the likelihood of more fish being caught by the use of hooks or nets. However, in bodies of water where strong currents and tides are prevalent, the chum is usually carried away too quickly to serve as a lure for fish to remain in the immediate vicinity of the fisherman.

In accordance with the present invention, the angler is provided with means whereby the float itself serves not only in its conventional capacity, but also has an instrumentality to dispense chum only at desired times and completely at the control of the angler. A small amount of chum released intermittently, will serve to attract fish carried along with the tide or current and which, passing at the moment, are drawn to the comparatively-large pieces of bait on the hooks. Since this device occupies approximately the same space as the conventional type float, it will readily be seen that it may be employed at any locality where the latter would be appropriate, the float-member serving to indicate, in its customary manner, when a fish has taken the bait. In the interim, the fisherman will intermittently move or jog his fish-line to thereby release comparatively-small portions or particles of the chum from the chum-holder of the float.

In the accompanying drawings, in which certain modes of carrying out the present invention are shown for illustrative purposes:

Fig. 1 is a central-longitudinal sectional view of one form which a combination float and chum-dispensing unit may assume in accordance with the invention;

Fig. 2 is a detached perspective view of the chum-holder of Fig. 1;

Fig. 3 is a central-longitudinal sectional view of another form which a combination float and chum-dispensing device may assume in accordance with the invention;

Fig. 4 is a fragmentary enlarged transverse sectional view taken on line 4—4 of Fig. 3; and Fig. 5 is a broken enlarged partial sectional and partial elevational detail view of a modified form of the chum-feeding plunger showing it in the open position.

The showing of Figs. 1 and 2

In the form illustrated in Figs. 1 and 2, a combination float and chum-dispensing device is indicated generally at 11 and comprises a buoyant float-member which, for example, may be a hollow airtight ball 12 having a centrally-positioned passageway or tube 13 extending therethrough. Detachably secured to the periphery of the hollow ball 12 and in frictional clamping engagement therewith is a cup-shaped chum-container or -holder 14 having an opening 15 at its lower end. The opening 15 and the tube 13 of the hollow ball are in substantial alignment and adapted to freely and slidably accommodate a plunger or stick 16.

The cup-shaped chum-holder 14 accommodates a supply of suitable fish lure, preferably finely-ground chum 17, through which the plunger 16 is adapted to be moved, as hereinafter described more fully. To limit the longitudinal travel of the plunger 16 in its up and down chum-feeding movements and to prevent its complete detachment from the ball 12 and chum-holder 14, a portion of the fisherman's line 18 is connected to an upper portion of the plunger 16 in such wise as to form a knot 19, which serves as a stop to limit downward movement of the said plunger and also as a plug to temporarily seal the upper end of the tube 13 until the angler moves the line to release some chum, as hereinafter described.

From the knot 19, the cord is led downwardly and about the float-member and chum-holder and then connected to a lower portion of the plunger to form another knot 20 which serves, in turn, both as a stop to limit upward movement of the plunger, and as a plug to seal the opening 15 in the chum-holder when temporarily in abutment therewith. The fishing-line 18, after forming the lower knot 20, extends downwardly in the customary manner, and may have a lightweight sinker 21 secured to its lower portion and as many hooks 22 intermediate the said knot and sinker as desired.

The function of the present form of the device and its mode of operation has been, in part, indicated from the foregoing description, but may be summarized as follows.

When it is desired to fish so that the combination float-member and chum-holder rides on the surface of the water and visible to the fisherman, and assuming the hooks 22 are baited and a supply of chum 17 is in the chum-holder 14; and further assuming the fishing-line 18 has been tied to the plunger 16 with the knots 19 and 20 and provided with a comparatively-light sinker 21, in order to maintain the combination float and chum-holder on the surface, and the plunger in the normal down position illustrated with the knot 19 resting on and sealing the upper end of the tube 13, the device is ready for effective operation.

The chum-feeding plunger 16 may be occasionally or intermittently twitched or jerked upwardly by the fisherman through the intermediary of the fishing-line 18, the somewhat abrupt upward movement given to the plunger preventing the simultaneous raising of the combination float-member and chum-holder by virtue of the inertia of the latter unit, or until the lower stop formed by the knot 20 on the plunger rises into abutment with the lowermost extremity of the chum-holder 14. On the return of the plunger to its down position, small portions and particles of the chum 17 adhering to the said plunger during its travel through the chum, will be disseminated in the water as they are withdrawn from the chum-holder in the manner described.

In the above manner, the angler may, as often as desired, manipulate the plunger to convey small portions of the chum as a lure to the fish. When a fish takes hold of the bait on any of the hooks 22, the customary bobbing or diving action of the float and its chum-holder will ensue, and the angler will be apprised of a bite on his line by the movements of the said float. The sealing action of the knots 19 and 20, it will be noted, further tends to assure an economical dispensing of the chum by their alternate closing of either of the outlets from the unit into the surrounding water when the plunger is at rest.

When it is desired to fish with the float and chum-holder beneath the surface, as in sub-surface chumming, the only difference in the procedure outlined above with respect to surface chumming will be the replacement of the comparatively-light sinker by one heavy enough to sink the combination float and chum-holder. For example, in twenty feet of water it may be desired to locate the device at five feet from the bottom, which merely entails the connecting of the fishing-line to the chum-feeding plunger, with the knots 19 and 20 arranged thereon in the spaced-apart relation illustrated and with sufficient length of line between the sinker and the lower knot to provide the five feet from the bottom location mentioned.

The mode of operation in sub-surface chumming is, of course, the same as when the device is on the surface. At intervals, the fisherman will give a twitch or jerk to the fishing-line 18 and thus raise the slidable plunger too quickly to be adhered to by the adjacent periphery of the tube 13 of the ball 12 or by that of the opening 15 of the chum-holder 14. The chum 17 will be dispensed in the manner described above, at the desired depth and in the economical small quantities indicated. The advantages of chumming as a means of attracting fish prior to their catching by net or hook is too well known to need explanation. These advantages accrue to the device of the present invention, which occupies approximately no more space than a conventional type float yet dispenses its own supply of chum in the convenient manner indicated and without interference with the normal action of the float-member.

The showing of Figs. 3 and 4

In this form of the invention, it is preferred to provide a solid float-member 31 composed of any suitable material such as cork, balsa wood, and the like, and with a centrally-positioned tube 32 extending therethrough. Detachably secured in any suitable manner to the lower end of the float-member 31, as by frictional engagement therewith, is a hollow chum-holder 33 having an opening 34 in alignment with the tube 32 of the chum-holder. The tube 32 and opening 34 slidably and freely accommodate a chum-feeding plunger 35.

In further accordance with the present form of the invention, the chum-feeding plunger 35 is preferably composed of a plurality of strands of wire helically entwined to provide a shank 36 which may have line-connectors 37 and 38 respectively at the opposite ends thereof. Fastened to the shank 36 of the plunger by its own aforesaid strands of wire, is a continuously-extending brush 39 whose bristles project spirally from the said shank 36.

At the upper terminal of the brush 39, a stop-member or ring 40 is fixed to the shank of the plunger, and at the lower end of the brush a ring 41 is secured in like manner. The stop-members or rings 40 and 41 serve as means to mount in spaced parallelism a plurality of strands of wire, preferably three in number, which are attached to and between the said stop-members in any suitable manner, as by soldering. These wires form a guard designated generally at 42, to prevent the fouling of the bristles of the brush when sliding in the opening 34 of the hollow chum-holder 33; and also serve as a guide to assure smooth reciprocation of the plunger in the said opening.

The mode of using the modified form of the invention shown in Figs. 3 and 4 is substantially the same as in the form illustrated in Figs. 1 and 2. In the present instance, the brush 39, with its spirally-arranged bristles, serves as a highly-efficient means of engaging and dispensing the chum 43 in the chum-holder 33. The fishing-line in the present instance, may be attached to the upper connector 37 and a leader or a desired length of fishing-line, with hooks and/or sinker, attached to the lower line-connector 38.

The fisherman at intervals, will twitch or jerk the fishing-line and this, in turn, will cause relative movement of the plunger 35 with respect to the float and chum-holder, thereby engaging the bristles of the brush 39 with particles of the chum in the holder, in the manner described above, and thus conveying the chum to and disseminating it in the surrounding water.

The upper stop 40 serves to limit the up and down travel of the plunger 35 through the chum in the chum-holder 33, and also functions to seal the opening 34 when engaged thereagainst. Since the upper stop 40 normally seats on and closes the opening 34, it will be understood that a substantial economy of the chum is achieved and its undesired excessive dissemination prevented.

The same advantages accrue to the present form of the invention as to the other form described, but in the present case, the actual dispensing of the chum will be somewhat greater than in the first form, by virtue of the tendency of the spiral brush 39 to gather or scrape an appreciable quantity of the chum and retain same between its convolutions until conveyed out of the chum-holder and into the water. If desired, the chum-holder 33 may be provided with apertures, but it is preferred to have the dissemination of the chum completely at the command of the angler and without continuous distribution of the chum from any apertures other than from the bottom opening 40, when the latter is unsealed by movement of the plunger.

*The showing of Fig. 5*

In this form of the invention, the chum-feeding plunger, herein designated generally at 51, comprises a wire helically wound to form a shank 52. The shank 52 has an upper sealing-stop 53 and a lower stop 54, the upper sealing-stop 53 functioning in the same manner as the stop 40 of the form illustrated in Figs. 3 and 4. This form of feeder or chum-feeding control can be used with the float and chum holder of either the form of Fig. 1 or Fig. 3. For convenience, a pair of connectors 55 and 56 is also provided at the top and bottom respectively of the plunger for the attachment of the fishing-line. Since the use and operation of the plunger 51 herein mentioned is practically the same as in the form of the invention depicted in Figs. 3 and 4, with which form it is preferably employed, no further explanation will be required. It may be pointed out, however, that the instant form of plunger is flexible and hollow and has a substantially-serrated outer surface which serves to scrape chum from the chum-holder in the manner of the plunger 35 of Figs. 3 and 4. However, due to the relatively-smoother surface of the plunger 51, less chum will be disseminated by the present plunger than that shown in Figs. 3 and 4. This may be preferred by some, particularly where the supply of chum at the moment may be limited.

While it is preferred to combine the chum-holder with a float, it will be understood that the chum-holder, together with its relatively-movable chum-dispensing member, may be used without the float in instances, for instance, where it is desired to connect to a net for catching small fish suitable for bait.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A combination float and chum-dispensing unit of the kind described and comprising: a float-member; a chum-holder connected to said float-member; and a chum-feeding plunger extending through said chum-holder and movable relative to said chum-holder to dispense chum from the latter; said plunger having an irregular surface for gathering chum thereon, and means extending through the float-member to move said chum-feeding plunger relative to said chum-holder and float-member.

2. A combination float and chum-dispensing unit of the kind described and comprising: a float-member; a chum-holder connected to said float-member; a chum-feeding plunger slidably arranged to move longitudinally through said chum-holder, said plunger having an irregular surface for gathering chum thereon and for carrying said chum from the interior to the exterior of the chum-holder; means extending through the float-member to move said plunger relative to said chum-holder and float-member; and stop-means arranged on spaced-apart portions of said plunger and effective to limit its movement relatively to the chum-holder.

3. A combination float and chum-dispensing unit of the kind described and comprising: a float-member; a chum-holder secured to said float-member; a chum-feeding member extending through said chum-holder and float-member and arranged to be moved relative thereto to release chum from the chum-holder, said chum-feeding member comprising a brush arranged to carry chum from the interior of said chum-holder to the exterior thereof, a guide fastened to the chum-feeding member and extending beyond the outer periphery of the brush; means to move said brush relative to said chum-holder and float-member; and stop-means fastened to the chum-feeding member and approximately at the upper and lower ends respectively of said brush; said stop-means being effective to limit upward and downward movement of the chum-feeding member with respect to the said chum-holder.

4. A combination float and chum-dispensing unit of the kind described and comprising: a float-member; said float-member having a centrally-positioned passageway extending therethrough; a chum-holder detachably and clampingly secured to said float; said chum-holder provided with an opening, said opening being in substantial alignment with said passageway; a chum-feeding plunger slidably accommodated in said passageway and said opening and movable therein to release chum from said chum-holder, said plunger including a wire shank and a plurality of bristles secured to said shank in spiral arrangement thereon for gathering chum thereon and carrying said chum from the interior to the exterior of said chum-holder; means to move said brush relative to said chum-holder and float-member; a pair of stops arranged in spaced relation on said shank; and a guide fastened to the plunger and between the pair of stops thereon, said stops limiting the motion of the plunger relatively to said float-member and chum-holder.

5. A combination float and chum-dispensing unit of the kind described and comprising: a float-member; a chum-holder secured to said float-member and having an opening therein; a longitudinally-positioned tube extending through the float and in alignment with said opening; a chum-feeding plunger reciprocatingly accommodated in said opening and provided with an irregular surface for gathering chum thereon and carrying said chum from the interior to the exterior of said chum-holder; a stop arranged on said plunger and within said chum-holder; a second stop arranged on the plunger but exteriorly of said chum-holder, said first-mentioned stop being effective to limit the motion of the plunger downwardly and serving to seal the opening of the chum-holder when the said plunger is at its lowermost position; said second-mentioned stop being effective to limit the motion of the plunger upwardly and also serving to seal the opening when the plunger is at its topmost position; and means extending through said tube and fastened to the top of said plunger, to move said plunger relative to said chum-holder and float-member.

6. A combination float and chum-dispensing unit of the kind described comprising a float-member, a chum-holder connected to said float-member and provided with a chum discharge opening at its lower end, a substantially straight chum-feeding member extending through said chum-holder, float-member and the discharge opening and arranged to be movable relative to the holder through the opening, said chum-feeding member being provided with a surface to which particles of chum will adhere to be released from said chum-holder and be carried through the opening by movement of said member, and means above and below the float and chum holder and constituting a part of the feeder for attachment of a line thereto.

7. A combination float and chum-dispensing unit of the kind described, comprising a float-member, a chum-holder connected to the float-member and provided with a chum discharge opening in its lower end, a chum-feeding member arranged to move longitudinally through said chum-holder, float member and said opening, said chum feeding member being provided with a surface to which particles of chum in the holder will adhere and be carried from the holder through said opening by its movement relative to the holder, and stop means arranged on said chum-feeding member to limit its movement relative to said chum-holder, and means above and below the float and chum-holder and constituting a part of the feeder for attachment of a line thereto.

8. A combination float and chum-dispensing unit of the kind described, comprising a float-member, a chum-holder connected to the float-member and provided with a chum discharge opening in its lower end, a chum-feeding member arranged to move longitudinally through said chum-holder, float member and said opening, said chum feeding member comprising a wire helically wound to form a shank passing through the discharge opening and forming an irregular surface for gathering chum thereon in the chum-holder and carrying it through the discharge opening by movement of the feeding member relative to the holder, and means above and below the float and chum-holder and constituting a part of the feeder for attachment of a line thereto.

9. The device as defined in claim 8 in which the shank is provided with spaced stops on opposite sides of the discharge opening in position to engage the end wall to limit movements of the shank therein and form closures for said opening at the limits of said movements.

10. A combination float and chum-dispensing unit of the kind described comprising a float-member, a chum-holder connected to said float-member and provided with a chum discharge opening at its lower end, a substantially straight chum-feeding member extending through said chum-holder, float-member and the discharge opening and arranged to be movable relative to the holder through the opening, said chum-feeding member being provided with a surface to which particles of chum will adhere to be released from said chum-holder and be carried through the opening by movement of said member, and upturned and down-turned loops at opposite ends of the feeding member and constituting a part of this member for attaching a line thereto.

11. A combination float and chum-dispensing unit of the kind described comprising a float member, a chum-holder connected to said float-member and provided with a chum discharge opening at its lower end, a substantially straight chum-feeding member extending through said chum-holder and the discharge opening and arranged to be movable relative to the holder through the opening, said chum-feeding member being provided with a surface to which particles of chum will adhere to be released from said chum-holder and be carried through the opening by movement of said member, and said feeding member being provided with means adjacent its opposite ends including an upturned loop at its lower end for attaching a line thereto.

12. A combination float and chum-dispensing unit of the kind described comprising a float member, a chum-holder connected to said float-member and provided with a chum discharge opening at its lower end, a substantially straight chum-feeding member extending through said chum-holder, float-member and the discharge opening and arranged to be movable relative to the holder through the opening, said chum-feeding member being provided with a surface to which particles of chum will adhere to be released from said chum-holder and be carried through the opening by movement of said member, and said feeding member having loops at its upper and lower ends constituting means to which the line is attached.

SAMUEL STEINBERG.

REFERENCES CITED

The following references are of record in the file of this patent:

UNITED STATES PATENTS

| Number | Name | Date |
|---|---|---|
| 2,208,240 | Arnesen et al. | July 16, 1940 |
| 2,226,331 | Allison | Dec. 24, 1940 |
| 2,465,127 | Stark | Mar. 22, 1949 |

FOREIGN PATENTS

| Number | Country | Date |
|---|---|---|
| 907,251 | France | Mar. 7, 1946 |